(12) United States Patent
Makita et al.

(10) Patent No.: US 11,162,808 B2
(45) Date of Patent: Nov. 2, 2021

(54) INFORMATION PROVIDING SYSTEM, VEHICLE, AND INFORMATION PROVIDING DEVICE

(71) Applicant: Toyota Jidosha Kabushiki Kaisha, Toyota (JP)

(72) Inventors: Mitsugu Makita, Nagoya (JP); Daigo Fujii, Tsushima (JP); Naoki Yamamuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 226 days.

(21) Appl. No.: 16/283,023

(22) Filed: Feb. 22, 2019

(65) Prior Publication Data

US 2019/0265061 A1 Aug. 29, 2019

(30) Foreign Application Priority Data

Feb. 26, 2018 (JP) .............................. JP2018-032116

(51) Int. Cl.
*G01C 21/36* (2006.01)
*G08G 1/00* (2006.01)
(Continued)

(52) U.S. Cl.
CPC ............. *G01C 21/36* (2013.01); *G01C 21/20* (2013.01); *G01C 21/3453* (2013.01);
(Continued)

(58) Field of Classification Search
CPC ...... G08G 1/0968; G08G 1/205; G01C 21/36; G01C 21/20; G01C 21/3453; G01C 21/367; G01C 21/00; G01C 21/12; G01C 21/005; G01C 21/26; G01C 21/34; G01C 21/3407; G01C 21/3461; G01C 21/3679; G01C 21/3685; G01C 21/3691; G01C 21/3694;
(Continued)

(56) References Cited

U.S. PATENT DOCUMENTS 8,484,199 B1 * 7/2013 Katragadda ............. G06F 16/29
707/723
2008/0021632 A1 * 1/2008 Amano ................... G01C 21/26
701/117
(Continued)

FOREIGN PATENT DOCUMENTS

DE 19933345 A1 * 1/2001 ......... G01C 21/3461
JP 2014214975 A 11/2014
JP 2017-049220 A 3/2017

*Primary Examiner* — Anthony R Jimenez
(74) *Attorney, Agent, or Firm* — Dinsmore & Shohl LLP

(57) ABSTRACT

An information providing system includes an information providing device and a vehicle. The information providing device includes an acquisition unit configured to acquire second information indicating a candidate point matching first information and evaluation of the candidate point and a second information transmitting unit configured to transmit the second information to the vehicle. The first information indicates a condition for searching for a point at which the vehicle stops when the vehicle is stopped and used for resting. The vehicle includes a second information receiving unit configured to receive the second information from the information providing device and an output unit configured to output the second information.

8 Claims, 4 Drawing Sheets

(51) Int. Cl.
*G01C 21/20* (2006.01)
*G01C 21/34* (2006.01)
*G08G 1/0968* (2006.01)

(52) U.S. Cl.
CPC ........... *G08G 1/0968* (2013.01); *G08G 1/205* (2013.01); *G01C 21/367* (2013.01)

(58) Field of Classification Search
CPC .......... G01C 21/3697; B60W 2550/00; B60W 2550/20; B60W 2550/40; B60W 2550/402; B60W 2550/406
USPC ....................................................... 701/410
See application file for complete search history.

(56) References Cited

U.S. PATENT DOCUMENTS

2015/0032660 A1* 1/2015 Manfield ................. B60L 1/003
　　　　　　　　　　　　　　　　　　　　　　　　705/347
2018/0141563 A1* 5/2018 Becker ............... G06K 9/00791

* cited by examiner

FIG. 2

| POINT | USER ID | QUIETNESS | DARKNESS | SAFETY | CONVENIENCE | COMPREHENSIVE EVALUATION |
|---|---|---|---|---|---|---|
| POINT X | 0001 | 4 | 4 | 1 | 1 | 3 |
| | 0002 | 5 | 4 | 2 | 2 | 3 |
| | 0003 | 4 | 3 | 2 | 1 | 4 |
| | ⋮ | ⋮ | ⋮ | ⋮ | ⋮ | ⋮ |
| | AVERAGE | 4.6 | 4.0 | 1.7 | 1.7 | 3.0 |
| POINT Y | 0004 | 3 | 3 | 4 | 5 | 4 |
| | 0005 | 3 | 4 | 4 | 5 | 5 |
| | 0006 | 4 | 3 | 4 | 4 | 4 |
| | ⋮ | ⋮ | ⋮ | ⋮ | ⋮ | ⋮ |
| | AVERAGE | 3.0 | 3.0 | 4.0 | 4.7 | 3.7 |
| POINT Z | 0007 | 1 | 1 | 5 | 4 | 2.8 |
| | 0008 | 2 | 3 | 5 | 3 | 3.3 |
| | 0009 | 1 | 2 | 4 | 5 | 3.0 |
| | ⋮ | ⋮ | ⋮ | ⋮ | ⋮ | ⋮ |
| | AVERAGE | 1.7 | 2.7 | 4.7 | 4.0 | 3.3 |

INFORMATION PROVIDING SYSTEM, VEHICLE, AND INFORMATION PROVIDING DEVICE

CROSS-REFERENCE TO RELATED APPLICATIONS

This application claims priority to Japanese Patent Application No. 2018-032116 filed on Feb. 26, 2018, which is incorporated herein by reference in its entirety including the specification, drawings and abstract.

BACKGROUND

1. Technical Field

The disclosure relates to an information providing system, a vehicle, and an information providing device.

2. Description of Related Art

Japanese Unexamined Patent Application Publication No. 2014-214975 (JP 2014-214975 A) discloses a comfortable environment selection support device including a storage unit that stores the favorite environmental conditions of users, an environmental information acquiring unit that acquires environmental information of a predetermined point in a target space, a suitable point searching unit that acquires favorite environmental conditions of a user who is a source of an operation command when an operation command for requiring environmental improvement is acquired from the user in the target space and searches for a point in the target space satisfying the favorite environmental conditions of the user based on the environmental information acquired by the environmental information acquiring unit, and a suitable point notifying unit that notifies a point searched for by the suitable point searching unit as a point satisfying the favorite environmental conditions of the user.

SUMMARY

However, the comfortable environment selection support device can notify a point satisfying favorite environmental conditions of a user, but may not notify a user of a suitable place when the user stops a vehicle and uses the vehicle for resting.

The disclosure provides an information providing system, a vehicle and an information providing device that can notify a user of a suitable place when the user stops a vehicle and uses the vehicle for resting.

A first aspect of the disclosure is an information providing system. The information providing system includes an information providing device and a vehicle. The information providing device includes an acquisition unit configured to acquire a candidate point matching first information and second information indicating evaluation of the candidate point and a second information transmitting unit configured to transmit the second information to the vehicle. The first information indicates a condition for searching for a point at which the vehicle stops when the vehicle is stopped and used for resting. The vehicle includes a second information receiving unit configured to receive the second information from the information providing device and an output unit configured to output the second information.

In the first aspect, the vehicle may further include an input unit configured to receive an input of the first information and a first information transmitting unit configured to transmit the first information to the information providing device. The information providing device may further include a first information receiving unit configured to receive the first information from the vehicle.

In the first aspect, the vehicle may further include a generation unit configured to generate route information indicating a route along which the vehicle is scheduled to travel and a route information transmitting unit configured to transmit the route information to the information providing device. The information providing device may further include a route information receiving unit configured to receive the route information from the vehicle, the acquisition unit may be configured to acquire the second information based on the first information and the route information, and the candidate point indicated by the second information may be located on the route.

In the first aspect, the generation unit may be configured to generate position information indicating a position on the route at which the vehicle is to arrive after a predetermined time elapses and the vehicle may further include a position information transmitting unit configured to transmit the position information to the information providing device. The information providing device may further include a position information receiving unit configured to receive the position information from the vehicle, the acquisition unit may be configured to acquire the second information based on the first information and the position information, and the candidate point indicated by the second information may be located within a predetermined range from the position indicated by the position information.

A second aspect of the disclosure is a vehicle. The vehicle includes a second information receiving unit configured to receive second information indicating a candidate point matching first information and evaluation of the candidate point from an information providing device and an output unit configured to output the second information. The first information indicates a condition for searching for a point at which the vehicle stops when the vehicle is stopped and used for resting.

In the second aspect, the vehicle may further include an input unit configured to receive an input of the first information and a first information transmitting unit configured to transmit the first information to the information providing device.

A third aspect of the disclosure is an information providing device. The information providing device includes an acquisition unit configured to acquire a candidate point matching first information and second information indicating evaluation of the candidate point and a second information transmitting unit configured to transmit the second information to the vehicle. The first information indicates a condition for searching for a point at which a vehicle stops when the vehicle is stopped and used for resting.

In the third aspect, the information providing device may further include a first information receiving unit configured to receive the first information from the vehicle.

According to the first aspect of the disclosure, it is possible to provide an information providing system that can notify a user of a suitable place when a vehicle is stopped and used for resting. According to the second aspect of the disclosure, it is possible to provide a vehicle that can notify a user of a suitable place when the vehicle is stopped and used for resting. According to the third aspect of the disclosure, it is possible to provide an information providing device that can notify a user of a suitable place when a vehicle is stopped and used for resting.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a diagram illustrating an example of points, user IDs, quietness, darkness, safety, convenience, and comprehensive evaluation which are stored in a storage medium according to the embodiment;

DETAILED DESCRIPTION

Figure 1:
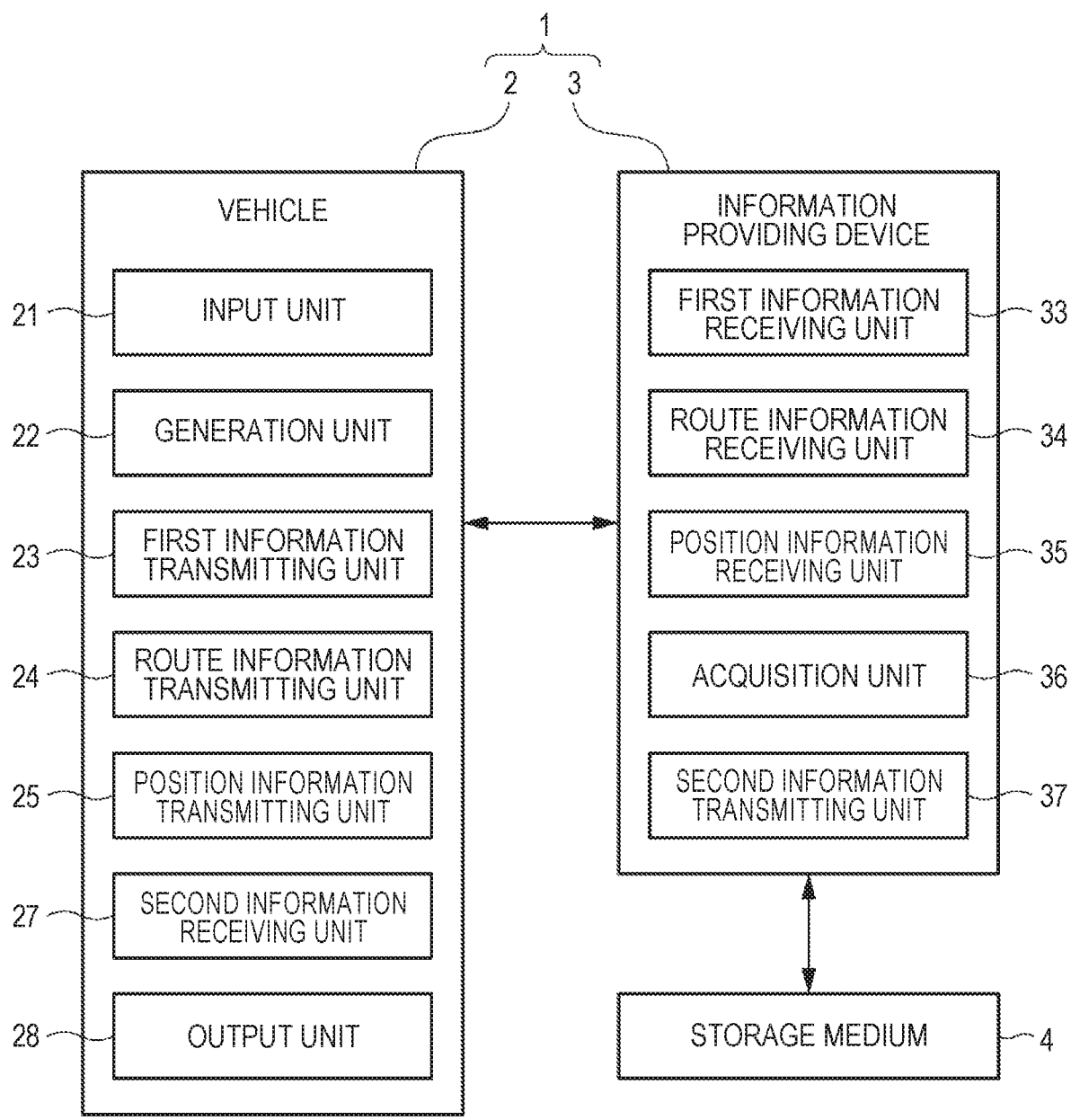
FIG. 1 is a diagram illustrating an example of a configuration of an information providing system, a vehicle, and an information providing device according to an embodiment.

An exemplary embodiment of the disclosure will be described below with reference to the accompanying drawings. In the drawings, elements referred to by the same reference sign have the same configuration.

Embodiment

An information providing system, a vehicle, and an information providing device according to an embodiment will be described below with reference to FIGS. 1 to 3.

The information providing system 1 includes a vehicle 2 and an information providing device 3 as illustrated in FIG. 1.

The vehicle 2 is rented, for example, in a car sharing service, and includes an input unit 21, a generation unit 22, a first information transmitting unit 23, a route information transmitting unit 24, a position information transmitting unit 25, a second information receiving unit 27, and an output unit 28. The input unit 21, the generation unit 22, and the output unit 28 may control vehicle functions of the vehicle 2. The input unit 21, the generation unit 22, and the output unit 28 may be constituted, for example, to include an electronic control unit (ECU). The vehicle 2 may use another device having a function equivalent to at least one of these elements. The first information transmitting unit 23, the route information transmitting unit 24, the position information transmitting unit 25, and the second information receiving unit 27 are included in, for example, a data communication module (DCM). The first information transmitting unit 23, the route information transmitting unit 24, the position information transmitting unit 25, and the second information receiving unit 27 may be a computer that controls a data communication module (DCM). The first information transmitting unit 23, the route information transmitting unit 24, the position information transmitting unit 25, and the second information receiving unit 27 may be constituted, for example, by a microprocessor and a memory storing a program.

The information providing device 3 is, for example, a server that is installed in a data center and includes a first information receiving unit 33, a route information receiving unit 34, a position information receiving unit 35, an acquisition unit 36, and a second information transmitting unit 37. The first information receiving unit 33, the route information receiving unit 34, the position information receiving unit 35, the acquisition unit 36, and the second information transmitting unit 37 take charge of control of the information providing device 3 and may be constituted, for example, by a microprocessor and a memory storing a program. The information providing device 3 may be a set of individual devices having functions of the elements, for example, a combination of edge servers that have functions of the five elements and are installed in five micro data centers.

The vehicle 2 and the information providing device 3 may further include an element other than the elements illustrated in FIG. 1.

The input unit 21 is, for example, a car navigation device that is mounted in the vehicle 2 and receives an input of first information.

The first information includes a condition for searching for a point at which the vehicle 2 stops when the vehicle 2 is stopped and used for resting, for example, a phone number, a facility name, a keyword associated with the point, an address or a post number indicating the point, a keyword indicating the point, and a keyword indicating an environment of the point. The keyword indicating the point may be, for example, "near Nagoya Castle." Examples of the keyword indicating an environment of the point include a "quiet place," a "dark place," a "safe place," and a "convenient place." Here, "resting" includes, for example, lodging, sleeping, light sleeping, and activities in a vehicle in addition to resting break. The first information is input, for example, by operating a touch panel display or a button of a car navigation device. Alternatively, the first information may be input by operating a user interface of a smartphone which is carried by an occupant of the vehicle 2 and be transmitted to the input unit 21. The first information does not have to be input by an occupant of the vehicle 2, and the first information in which a predetermined condition is set may be input to the car navigation device in advance. By causing an occupant to input the first information at the time of initial setting of the car navigation device and to set a condition of the first information as defaults, notification of the first information may be performed when the predetermined condition of the first information is satisfied without the first information being input by an occupant in next time.

The generation unit 22 generates route information and position information. The route information indicates a route along which the vehicle 2 is scheduled to travel. The route information is generated, for example, as map information acquired by the car navigation device, a current position of the vehicle 2 which is identified by a global positioning system (GPS) receiver mounted in the vehicle 2, and a destination of the vehicle 2 which is received by the input unit 21. The position information indicates a position on the route at which the vehicle 2 will arrive after a predetermined time elapses. The position information is generated, for example, from the route information, the current position of the vehicle 2 which is identified by the GPS receiver, and a vehicle speed which is measured by a vehicle speed sensor mounted in the vehicle 2.

The first information transmitting unit 23 transmits the first information to the information providing device 3. The route information transmitting unit 24 transmits the route information to the information providing device 3. The position information transmitting unit 25 transmits the position information to the information providing device 3.

The second information receiving unit 27 receives a candidate point matching the first information and second information indicating evaluation of the candidate point from the information providing device 3. Here, the second information indicates a candidate point matching the first information and evaluation of the candidate point. Evaluation of a candidate point may be, for example, an average of five-grade evaluations of quietness, darkness, safety, convenience, and comprehensive evaluation which represent an environment of the candidate point and which have been evaluated by individual users.

For example, as illustrated in second to sixth rows from the uppermost in FIG. 2, point X is subjected to five-grade evaluation of five items by users who are identified by user IDs "0001," "0002," "0003," . . . , and an average thereof is calculated for each of the five items. The same is true of point Y and point Z. The second information is stored, for example, in a storage medium 4 illustrated in FIG. 1. The storage medium 4 may be installed in the information providing device 3.

The output unit 28 is, for example, a touch panel display or speaker of the car navigation device mounted in the vehicle 2, and outputs the second information to an occupant of the vehicle 2 in at least one form of still image, moving image, and voice.

Figure 3:
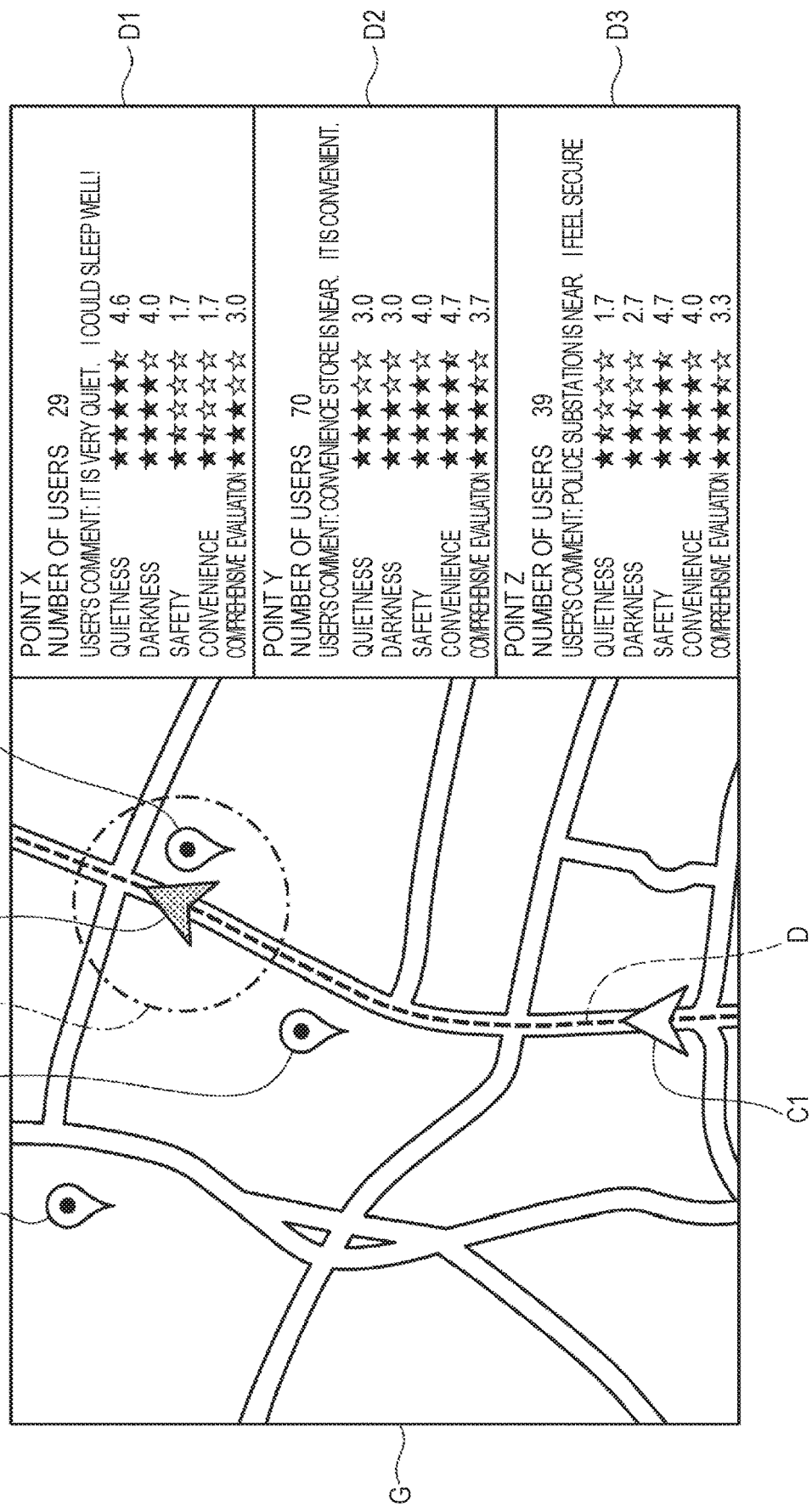
FIG. 3 is a diagram illustrating an example of second information which is output from an output unit of a vehicle according to the embodiment.

For example, the output unit 28 outputs the second information as an image G illustrated in FIG. 3. Three candidate points, that is, point X, point Y, and point Z, are displayed in the image G.

Point X is a candidate point matching a first condition, a position thereof is marked by an icon P1, and evaluation thereof is displayed in a display area D1. The display area D1 shows the number of users "29" who have evaluated point X, a representative user's comment for point X "It is very quiet. I could sleep well!", and averages of five-grade evaluations of five items which have been performed in advance by 29 users. The display area D1 shows that the averages of the five-grade evaluations of quietness, darkness, safety, convenience, and comprehensive evaluation are "4.6", "4.0", "1.7", "1.7", and "3.0".

Similarly, point Y is a candidate point which matches the first condition and which is located on a route indicated by a dotted line D passing through a current position of the vehicle 2 indicated by an icon C1, and a position thereof is marked by an icon P2. The evaluation of point Y is displayed in a display area D2 in the same form as the display area D1.

Similarly, point Z is a candidate point which matches the first condition, which is located on a route indicated by a dotted line D passing through a current position of the vehicle 2 indicated by an icon C2, and which is located in a circle A centered on a position at which the vehicle 2 will arrive on the route indicated by the dotted line D after a predetermined time elapses, and a position thereof is marked by an icon P3. The evaluation of point Z is displayed in a display area D3 in the same form as the display area D1.

The output unit 28 may transmit a still image, a moving image, or voice indicating the second information to a smartphone which is carried by an occupant of the vehicle 2 and may output the second information through a display or a speaker of the smartphone.

The first information receiving unit 33 receives the first information from the vehicle 2. The route information receiving unit 34 receives the route information from the vehicle 2. The position information receiving unit 35 receives the position information from the vehicle 2.

The acquisition unit 36 acquires second information indicating a candidate point matching the first information and second information indicating evaluation of the candidate point. The candidate point indicated by the second information may be located on the route indicated by the route information or may be located within a predetermined range from the position indicated by the position information.

The second information transmitting unit 37 transmits the second information to the vehicle 2.

Figure 4:
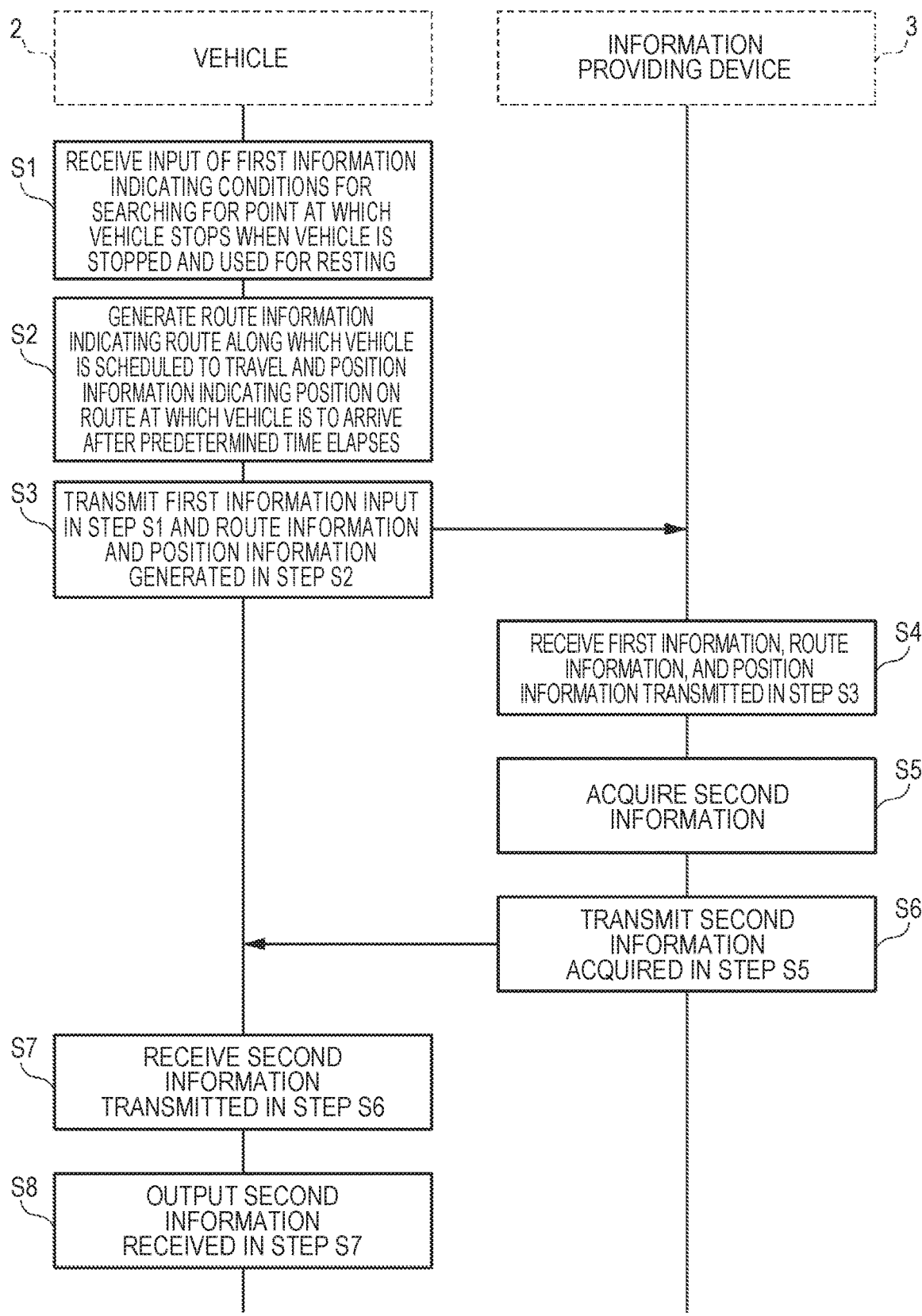
FIG. 4 is a sequence diagram illustrating an example of a routine which is performed by the vehicle and the information providing device according to the embodiment.

An example of an exemplary processing routine which is performed by the vehicle 2 and the information providing device 3 according to the embodiment will be described below with reference to FIG. 4.

In Step S1, the input unit 21 receives an input of first information indicating a condition for searching for a point at which the vehicle 2 stops when the vehicle 2 is stopped and used for resting.

In Step S2, the generation unit 22 generates route information indicating a route along which the vehicle 2 is scheduled to travel and position information indicating a position on the route at which the vehicle 2 is to arrive after a predetermined time elapses.

In Step S3, the vehicle 2 transmits the first information input in Step S1 and the route information and the position information generated in Step S2 using the first information transmitting unit 23, the route information transmitting unit 24, and the position information transmitting unit 25, respectively.

In Step S4, the information providing device 3 receives the first information, the route information, and the position information transmitted in Step S3.

In Step S5, the acquisition unit 36 acquires second information.

In Step S6, the second information transmitting unit 37 transmits the second information acquired in Step S5.

In Step S7, the second information receiving unit 27 receives the second information transmitted in Step S6.

In Step S8, the output unit 28 outputs the second information received in Step S7.

An embodiment of the disclosure has been described above. In the information providing system 1 according to the embodiment, the vehicle 2 transmits the first information, the information providing device 3 acquires the second information indicating a candidate point matching the first information and evaluation of the candidate point and transmits the second information to the vehicle 2, and the vehicle 2 outputs the second information. Accordingly, the information providing system 1 can notify a user of a suitable place when the vehicle 2 is stopped and used for resting.

The second information may indicate a candidate point which matches the first information and which is located on the route indicated by the route information and evaluation of the candidate point. Accordingly, the information providing system 1 can notify a user of a suitable place at which the user can arrive easily when the vehicle 2 is stopped and used for resting.

In addition, the second information may indicate a candidate point which matches the first information and which is located within a predetermined range from the position indicated by the position information and evaluation of the candidate point. Accordingly, the information providing system 1 can notify a user of a suitable place when the vehicle 2 is stopped and used for resting, and notify the user within what time the user can arrive at the place.

The disclosure is not limited to the above-mentioned embodiment and can be modified in various forms without departing from the gist of the disclosure. Accordingly, the above-mentioned embodiment is exemplary in all respects and is not to be construed as restrictive. For example, the above-mentioned steps of the routine may be performed in an arbitrarily changed order or in parallel as long as the process details do not cause inconsistency.

What is claimed is:

1. An information providing system comprising:
an information providing device; and
a vehicle, wherein
the information providing device includes
an acquisition unit configured to acquire second information indicating a candidate point for stopping the vehicle and resting matching first information and evaluation of the candidate point, the first information indicating a condition for searching for a point for the vehicle to stop when the vehicle is used for resting, wherein the condition includes at least one of a degree of darkness or a degree of quietness, and
a second information transmitting unit configured to transmit the second information to the vehicle, and wherein
the vehicle includes
a second information receiving unit configured to receive the second information from the information providing device, and
an output unit configured to output the second information.

2. The information providing system according to claim 1, wherein
the vehicle further includes
an input unit configured to receive an input of the first information and
a first information transmitting unit configured to transmit the first information to the information providing device, and wherein
the information providing device further includes a first information receiving unit configured to receive the first information from the vehicle.

3. The information providing system according to claim 2, wherein
the vehicle further includes
a generation unit configured to generate route information indicating a route along
which the vehicle is scheduled to travel and
a route information transmitting unit configured to transmit the route information to the information providing device, and wherein
the information providing device further includes a route information receiving unit configured to receive the route information from the vehicle,
the acquisition unit is configured to acquire the second information based on the route information, and
the candidate point indicated by the second information is located on the route.

4. The information providing system according to claim 3, wherein
the generation unit is configured to generate position information indicating a position on the route at which the vehicle is to arrive after a predetermined time elapses and
the vehicle further includes a position information transmitting unit configured to transmit the position information to the information providing device, and wherein
the information providing device further includes a position information receiving unit configured to receive the position information from the vehicle,
the acquisition unit is configured to acquire the second information based on the position information, and
the candidate point indicated by the second information is located within a predetermined range from the position indicated by the position information.

5. A vehicle comprising:
a second information receiving unit configured to receive second information indicating a candidate point for stopping the vehicle and resting matching first information and evaluation of the candidate point from an information providing device, the first information indicating a condition for searching for a point for the vehicle to stop when the vehicle is used for resting, wherein the condition includes at least one of a degree of darkness or a degree of quietness; and
an output unit configured to output the second information.

6. The vehicle according to claim 5, further comprising:
an input unit configured to receive an input of the first information; and
a first information transmitting unit configured to transmit the first information to the information providing device.

7. An information providing device comprising:
an acquisition unit configured to acquire second information indicating a candidate point for stopping a vehicle and resting matching first information and evaluation of the candidate point, the first information indicating a condition for searching for a point for the vehicle to stop when the vehicle is used for resting, wherein the condition includes at least one of a degree of darkness or a degree of quietness; and
a second information transmitting unit configured to transmit the second information to the vehicle.

8. The information providing device according to claim 7, further comprising a first information receiving unit configured to receive the first information from the vehicle.

* * * * *